UNITED STATES PATENT OFFICE.

FRITZ HESSE, OF DRESDEN, GERMANY, ASSIGNOR TO THE FIRM OF DEUTSCHE KUNST-LEDER AKTIEN-GESELLSCHAFT, OF KÖTITZ, NEAR COSWIG, GERMANY.

APPLICATION OF ADHESIVE SUBSTANCES TO TEXTILE FABRICS AND THE LIKE.

1,065,684. Specification of Letters Patent. Patented June 24, 1913.

No Drawing. Application filed November 13, 1911. Serial No. 660,078.

*To all whom it may concern:*

Be it known that I, FRITZ HESSE, a subject of the King of Prussia, residing at 20 Strehlenerstrasse, Dresden, Germany, have invented new and useful Improvements in and Relating to the Application of Adhesive Substances to Textile Fabrics and the Like, of which the following is a specification.

This invention relates to the method of cementing together lengths of fabrics by means of, or coating fabrics with, an adhesive substance applied in a finely divided or powdered condition, and more particularly to the manufacture of artificial leather by means of a coating of powdered nitrocellulose or celluloid applied to a suitable fabric.

The cementing together of two continuous lengths of material by means of an adhesive substance applied in powdered form is already known. In effecting such cementing of two fabrics it has been proposed to apply the powder between the two layers or sheets, which layers or sheets have previously been damped or treated with a solvent for the powdered adhesive substance. It has also been proposed to apply the powdered adhesive substance to the textile or other material and then to dissolve such substance by the application of a solvent in gas or vapor condition. In both these cases the material to which the adhesive substance is applied is damped or saturated with the solvent, thus giving an unnecessary consumption and loss of solvent and in some cases damaging the material to which the adhesive is applied.

In carrying this invention into effect the above indicated disadvantages are avoided, as the powdered adhesive applied to the material is dissolved by means of a thin solution of the same or other suitable adhesive substance.

I will describe my improved process as applied to the production of artificial leather, from which description its application for the production of other materials will be understood. Leather so produced has the advantage of being provided, simultaneously with the bringing into solution of the applied adhesive substance, with a layer of varnish, while in the ordinary method at present employed of applying the solvent in the condition of gas or vapor, the required layer of varnish must be subsequently applied.

In preparing artificial leather from one or several breadths of fabric, celluloid or nitro-cellulose in powder form is—according to the present invention—applied either by hand or in some mechanical way upon or between the unmoistened breadths of fabric which are to be coated. As solvent of the adhesive one may use acetone, for instance, which, by a slight addition of celluloid or of nitro-cellulose, is concentrated to such an extent as to attain a consistency approximately between that of the thin mineral oil and that of castor-oil. By this concentration of the solvent after application to the fabric, a too rapid permeation and an excessive saturation of the breadth of the fabric is avoided.

It is the essential feature of this invention that the solvent for the applied powdered adhesive substance is itself a thin solution of either the same adhesive substance or other suitable adhesive, as solvents when applied by themselves to dissolve the powdered adhesive substance at once, in consequence of their extreme fluidity and penetrating powers, saturate or damp the fabric and deteriorate the final product and cause loss of adhesive substance.

The content of celluloid or other adhesive in the thin solutions may be very small, as the desired object may be attained if such solution, which acts to dissolve the applied powdered adhesive substance, has the viscosity of mineral oil or of castor oil.

By the improved treatment of the applied powdered adhesive substance the artificial leather takes up only a small quantity of liquid compared with the quantity of substance. After the substance has been brought into its dissolved state the solvent is evaporated in the known manner.

Having now particularly described and ascertained the nature of my said invention and in what manner the same is to be performed, I declare that what I claim is:—

1. A process for preparing artificial leather from one or several breadths of fabric which consists in applying adhesive substances in powder form upon or between the dry breadths of fabric and dissolving the adhesive substances by treating them with an appropriate solvent which has been brought to the consistency of oil by a slight addition of adhesive substances.

2. A process for preparing artificial leather from one or several breadths of fabric which consists in applying celluloid in powder form upon or between the dry breadths of fabric and dissolving the celluloid powder by treating it with an appropriate solvent which has been brought to the consistency of oil by a slight addition of celluloid.

In testimony whereof I have signed my name to this specification in the presence of two subscribing witnesses.

FRITZ HESSE.

Witnesses:
 PAUL ARRAS,
 ARTHUR GUBE.